E. G. Allen,
R. R. Frog,
No. 2405, Reissued Dec. 4, 1866.
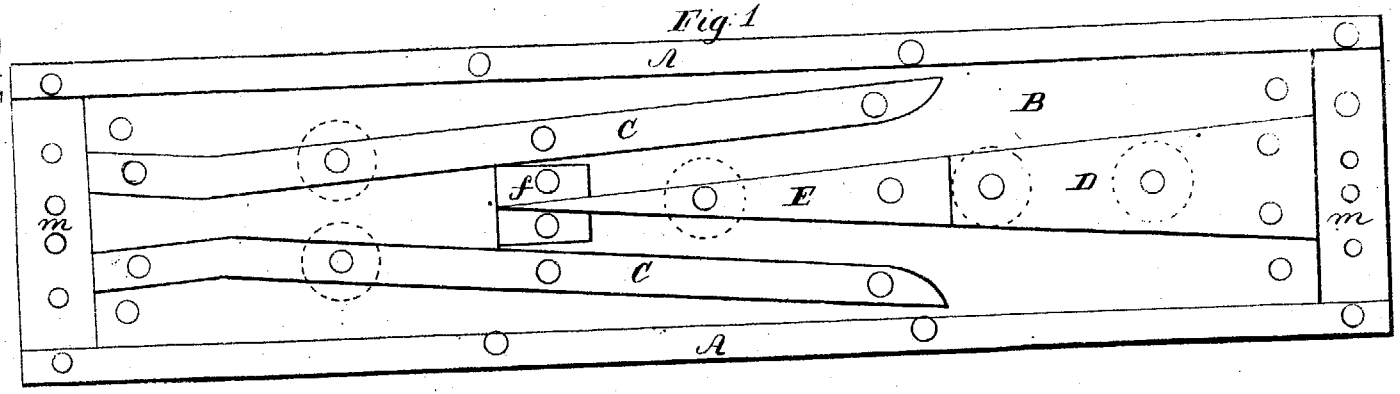
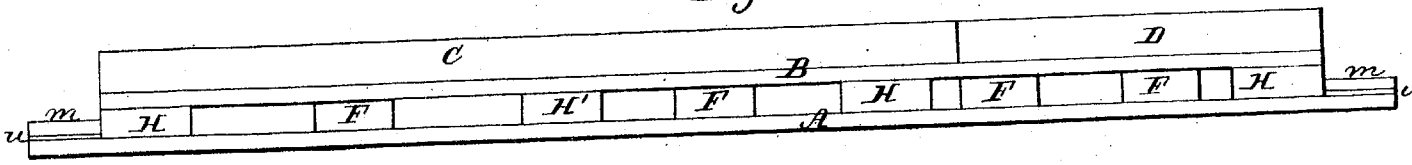
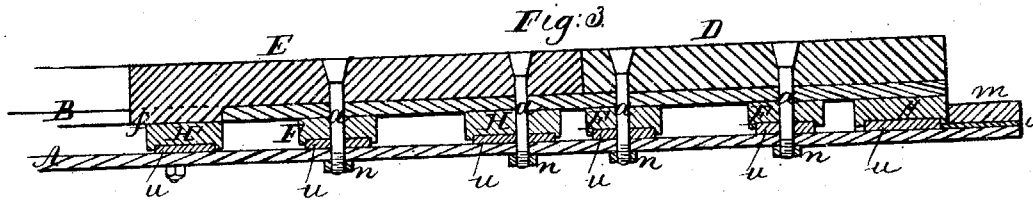
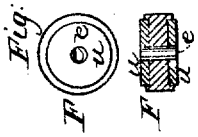
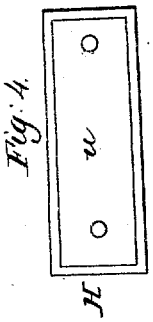
Witnesses.
D. T. Doag
Henry R. Walton.
Inventor.
E. G. Allen
By H. C. Dodge
Atty.

United States Patent Office.

IMPROVEMENT IN RAILROAD FROGS.

E. G. ALLEN, OF BOSTON, MASSACHUSETTS.

*Letters Patent No.* 58,196, *dated September* 25, 1866; *reissue No.* 2,405, *dated December* 4, 1866.

SPECIFICATION.

TO ALL WHOM IT MAY CONCERN:

Be it known that I, E. G. ALLEN, of Boston, in the county of Suffolk, and State of Massachusetts, have invented a new and useful Improvement in Railroad Frogs; and I do hereby declare that the following is a clear, full, and exact description of the same, reference being had to the accompanying drawings, making part of this specification, and to the letters of reference marked thereon, like letters indicating like parts wherever they occur.

Figure 1 is a top plan view.

Figure 2, a side elevation.

Figure 3, a longitudinal vertical section, taken on the line *x x* of fig. 1.

Figures 4 and 5 are views of portions detached.

My invention consists, first, in constructing a frog of two or more plates, with intervening supports, to form a truss frame or support; and second, in a novel construction of the supports for the reception of an elastic material; and third, in providing the point of the toe-piece of the frog with a broad bearing plate, to secure it more firmly in position, and prevent it from becoming accidentally displaced, and at the same time permit it to be removed and replaced, when worn, with facility.

A represents the bed-plate, which is simply a flat, wide bar of iron; and B is a similar bar of metal, to which the rails of the frog are secured, as hereinafter explained. Between these plates A and B are placed a series of metallic blocks or supports H, the form of which is clearly shown in fig. 4. In addition to these, a series of circular supports or studs, F, are also used, their position being indicated by the dotted lines in fig. 1, they being located intermediate between the supports H, as represented in figs. 2 and 3. These supports H and F are formed with a recess or cavity in one or both faces, to receive a sheet of rubber or other elastic material, as represented by *u* in figs. 3, 4, and 5, in which it is shown both in plan and in section. The rubber or other elastic material, *u*, is made to fill the recess in the face of the supports H and F, and to protrude beyond the face or surface thereof, as shown clearly in figs. 3 and 5. When these supports, thus provided with the elastic material, are placed between the plates A and B, it will be observed that the protruding face of the elastic material will rest upon the plate A, as in fig. 3, and will thus serve the twofold purpose of rendering the parts slightly elastic, and also deadening the sound produced by the wheels of the cars in passing over the frog. C represents the wings or side rails of the frog, and D the heel portion, and E the toe-piece of the frog. All these parts are constructed separately, and are secured in their proper position by means of bolts *a*, which pass through them, and also through the plates B, supports H or E, and plate A, these bolts having conical heads fitting into corresponding recesses in the upper surface of the rails, and being secured by nuts *n* underneath the plate A, thus uniting all the parts firmly together, as represented in fig. 3. The toe-piece E, at its point, is provided with a broad, firm bearing, consisting of a plate *f*, fig. 1, which is formed solid with the toe-piece E. This plate *f* is made of the same thickness as the plate B, and the latter has a hole or opening cut in it, of proper size to receive the plate *f* and let its lower side rest on the support or block H′, and where it is secured by bolts, as represented in fig. 1. By this method of constructing and securing the toe-piece E, it is very firmly secured in position, and accidental displacement is prevented, while at the same time it can be very easily and readily removed, when worn or injured, and another substituted, without disturbing or disarranging the other parts. By forming the supports H and F with a recess for holding the elastic material, as described, the latter is held securely in place, and is prevented from being crushed and displaced by the great weight of the cars in passing over it. By constructing the frog of plates and supports, as described, I form a truss frog, thus rendering it far more light, elastic, and durable than the ordinary solid frog, and one that is equally strong. By these means much of the wear and tear incident to the passage of cars over the frogs, both upon the frog and also of the cars, is obviated. It is obvious that if desired the elastic material *u* may be omitted, in which case the supports H and F may be made solid, without any recess.

Having thus described my invention, what I claim, is—

1. The combination and arrangement of the plates A and B, with their supports H and F, with or without the elastic packing *u*, connected together substantially as and for the purpose specified.

2. In a truss railroad frog, constructed substantially as herein set forth, I claim the use of the supports H and F, recessed to receive and hold the elastic material *u*, as set forth.

3. I claim the plate *f*, at the point of the toe-piece E, fitted in the hole in plate A, and secured to the support H′ by means of bolts, all arranged as shown and described.

E. G. ALLEN.

Witnesses:

F. F. KIRBY,

P. T. DODGE.